United States Patent
Mueller (10) Patent No.: US 12,287,625 B2
(45) Date of Patent: Apr. 29, 2025

(54) METHOD AND REPRODUCTION UNIT FOR REPRODUCING PROTECTED MESSAGES

(71) Applicant: dSPACE digital signal processing and control engineering GmbH, Paderborn (DE)

(72) Inventor: Bjoern Mueller, Paderborn (DE)

(73) Assignee: dSPACE GMBH, Paderborn (DE)

(*) Notice: Subject to any disclaimer, the term of this patent is extended or adjusted under 35 U.S.C. 154(b) by 470 days.

(21) Appl. No.: 17/399,655

(22) Filed: Aug. 11, 2021

(65) Prior Publication Data

US 2021/0373545 A1 Dec. 2, 2021

Related U.S. Application Data

(63) Continuation of application No. PCT/EP2020/053254, filed on Feb. 10, 2020.

(30) Foreign Application Priority Data

Feb. 11, 2019 (DE) ...................... 10 2019 103 331.4

(51) Int. Cl.
G05B 23/02 (2006.01)
G05B 17/02 (2006.01)

(52) U.S. Cl.
CPC ......... *G05B 23/0256* (2013.01); *G05B 17/02* (2013.01); *G05B 2219/23446* (2013.01); *G05B 2219/2637* (2013.01)

(58) Field of Classification Search
None
See application file for complete search history.

(56) References Cited

U.S. PATENT DOCUMENTS 9,510,216 B2 11/2016 Izu et al.
9,882,791 B2 1/2018 Grotendorst et al.
(Continued)

FOREIGN PATENT DOCUMENTS

CA 2871064 A1 * 10/2013 ......... H04L 63/0846
CA 2979653 A1 * 3/2018 ......... H04L 63/0428
(Continued)

OTHER PUBLICATIONS

Japanese Office Action dated Jan. 4, 2023 in corresponding application 2021-546774.
(Continued)

*Primary Examiner* — Raul J Rios Russo
*Assistant Examiner* — Carl F. R. Tchatchouang
(74) *Attorney, Agent, or Firm* — Muncy, Geissler, Olds & Lowe, P.C.

(57) ABSTRACT

A method and replay unit for sending secured messages via a messaging system to a receiver ECU to be tested, wherein the replay unit is connected to the device under test via the messaging system, wherein the replay unit is set up to receive first secured messages to be replayed, to remove from the first secured messages a first counter value and a first authenticator, and to generate a second authenticator by means of a second counter value, an encryption algorithm and a key, and wherein the replay unit is set up to generate second secured messages by adding the second counter value and the second authenticator to the first messages, and wherein the replay unit is further adapted to send the second secured messages to the recipient device under test via the messaging system.

13 Claims, 5 Drawing Sheets

(56) References Cited

U.S. PATENT DOCUMENTS

| | | |
|---|---|---|
| 9,923,722 B2 | 3/2018 | Nanjundappa |
| 11,221,863 B2 | 1/2022 | Azizian et al. |
| 2009/0196421 A1 | 8/2009 | Okuda |
| 2016/0085567 A1 | 3/2016 | Holler |
| 2017/0242409 A1 | 8/2017 | Tegethoff et al. |
| 2017/0331699 A1 | 11/2017 | Lee et al. |
| 2018/0131522 A1 | 5/2018 | Lawlis et al. |
| 2018/0148006 A1 | 5/2018 | Haga et al. |
| 2022/0091867 A1 | 3/2022 | Azizian et al. |

FOREIGN PATENT DOCUMENTS

| | | |
|---|---|---|
| DE | 102017107879 A1 | 10/2017 |
| JP | 2002176448 A | 6/2002 |
| JP | 2009188751 A | 8/2009 |
| JP | 2016529624 A | 9/2016 |
| WO | WO2013072973 A1 | 5/2013 |
| WO | WO2015023841 A1 | 2/2015 |

OTHER PUBLICATIONS

Kobayashi Nobuhiro Others—Security Technology corresponding to Wireless Mesh Network, Mitsubishi Electric Technical Report, Japan—Nov. 25, 2012, and $86^{th}$ vol. No. 11 and p. 47 (635)-50 (638)-.

Murakami Nobuo, a trial production and simulation of the control system by dSpace, Interface, Japan, CQ publication incorporated company, Oct. 1, 1999, $25^{th}$ vol. No. 10, p. 122-127.

International Search Report dated Apr. 17, 2020 on corresponding application PCT/EP2020/053254.

Horauer et al; "A Test Tool for FlexRay-based Embedded Systems", IEEE PI Jul. 1, 2007—ISBN978-1-4244-0839-9.

Weber; "New Communication Paradigms in Automotive Networking"—Aug. 1, 2015.

CANalyzer Product Information.

Ethernet-Security at the example SME/IP—VDI/VW communa conference automotives Security, Oct. 21-22, 2015.

Islinger et al; "Autostar SecOC for CAN FD"; CAN Newsletter Jan. 2017.

\* cited by examiner

METHOD AND REPRODUCTION UNIT FOR REPRODUCING PROTECTED MESSAGES

This nonprovisional application is a continuation of International Application No. PCT/EP2020/053254, which was filed on Feb. 10, 2020 and which claims priority to German Patent Application No. 10 2019 103 331.4, which was filed in Germany on Feb. 11, 2019, and which are both herein incorporated by reference.

BACKGROUND OF THE INVENTION

Field of the Invention

The present invention relates to a method and a system for sending recorded secured messages via a messaging system to a receiver ECU to be tested, in particular an ECU to be tested.

Description of the Background Art

In the field of bus simulation for testing ECUs, for example in the automotive sector, the focus is on simulating the bus communication of one or more ECUs as realistically as possible. In the area of control unit (ECU) protection, manipulation of bus communication is also relevant.

In this case, bus communication can be simulated "live" in a test environment (e.g., using dSPACE GmbH's Micro-Autobox, VEOS, or SCALEXIO products for an offline or hardware-in-the loop (HIL) simulation) or by replaying a recorded bus communication.

In the simplest case, for the communication used in vehicles, it is provided that the transmitted signals are sent as a sole payload in bus or network messages.

However, new standards (AUTOSAR≥4.2.1 as well as FIBEX≥4.1.2) enhance this so that the user data are additionally authenticated or protected (see e.g. Secure Onboard Communication, Cryptographic PDU, Transport Layer Security, IPsec (Internet Protocol Security)).

The data generated in an ECU or as part of a bus simulation are often recorded for later replay for test purposes. Up to now, it was possible to replay the recorded bus communication unchanged in order to simulate a correct bus communication to one or more receiver ECUs.

Logging of bus communication can be performed by tools from dSPACE GmbH (Bus Navigator or Autera), for example. Such tools are often also capable of replaying the recorded and saved bus communication.

The new encryption and authentication algorithms of the above standards aim to prevent so-called replay attacks. Bus communication secured with such algorithms cannot therefore be used without further ado for the stimulation of control units by means of simple replay.

As a rule, the secured messages recorded in the vehicle or simulated with a simulator for test purposes contain information formed of header, user data, monotonically increasing counter value and authentication code (encrypted).

The problem with the replay is that while the user data may be correct, in all likelihood the counter value of the recorded data will not match the counter value of the control unit to be tested (since the counter is monotonically increasing, it cannot be changed either). Even if this could be reset, the authenticator value (also authenticator) created for authentication no longer matches the counter value, since the encrypted authenticator value is composed of a value, which is determined based on the user data, and the counter value.

Up to now, if this problem occurred in the early development phases, authentication was usually disabled in the receiver ECU. In this case, however, authentication can no longer be tested.

SUMMARY OF THE INVENTION

It is therefore an object of the present invention to provide a method and a replay unit that improve on the prior art so as to enable replay even with encryption and authentication algorithms implemented.

The object is achieved by an exemplary method, wherein the method comprises the steps of: providing first secured messages for processing in a replay unit, wherein the first messages comprise a payload, a first counter value, and a first authenticator, wherein the following information is stored in, or provided to, the replay unit (i.e., the information is either stored in a memory associated with the replay unit or the replay unit has access to the information stored in the test environment); at least portions of a communication description for the receiver ECU to be tested or an algorithm for data interpretation; a second counter value for the receiver ECU under test; Information about encryption and a corresponding key by means of the replay unit; removing the first authenticator and the first counter value from the first secured messages using the communication description or using information obtained by means of the algorithm for data interpretation; creating second secured messages by adding in each case the second counter value and creating and adding in each case a second authenticator using the second counter value, the information about encryption and the key, and using the communication description or the information obtained by means of the algorithm for data interpretation; and sending the second secured messages to the receiver ECU under test.

The essence of the method according to the invention is that by means of the replay unit according to the invention, for the replay of the data, the recorded secured messages are manipulated before replay in such a way that a receiver ECU accepts them as correct messages. In order to make this manipulation possible at all, either (required portions of) a communication description (e.g., (at least portions of) a communication matrix, also called a K-matrix) or an algorithm for interpreting the data contained in the messages is stored in the replay unit so that the counter value and authenticator can be identified in the messages.

The replay tool according to the invention (the replay unit) separates the individual message components on the basis of a read-in communication description. In the further course of the method, the header and user data information are reused.

Preferably, based on the information contained in the communication description and the information specified by the user about encryption, a new increasing counter value and a new and suitable authentication code (authenticator) corresponding to the user data, the counter value and the encryption algorithm are generated for the replay. The information about encryption depends on where the invention is used or which protection mechanism is present (examples are SecOC or IPSec, . . . ). They include, for example, the encryption algorithm and, possibly, further information concerning the encryption algorithm, e.g., what the algorithm is applied to (bit or byte)). With this information, a new complete message is generated, or the original first message (obsolete due to the obsolete counter value/ authenticator) is reprocessed into a second message which is accepted by the receiver ECU (i.e., the (control) unit under test).

The current counter value (e.g., in the form of a so-called freshness value or a sequence number) for the ECU under test generally is available globally and is thus known to the test environment (i.e., the HIL simulator or the offline simulator or a host PC connected to the simulator).

In an embodiment of the invention, the second counter value is given by the current counter value of the ECU under test. In an example, the second counter value can be preset by a user or is calculated according to a predefined algorithm.

The replay unit can include all components and/or modules, which are necessary for the generation of these values and the subsequent merging. In particular, these include the log file import, the K-matrix import, the deserialization, the counter value generation and the encryption algorithm. Alternatively, the components and/or modules can also only provide the required information to the replay unit without being implemented in the replay unit but instead, for example, elsewhere in the test environment.

The abovementioned components and modules are known individually as part of different bus simulation software, e.g., RTI CAN MM, FlexRay Configuration Package, Ethernet Configuration Package (or the Bus Manager) or bus experimentation software (Bus Navigator). One difference to the state of the art is that in typical applications the user data is generated by an offline or real-time model, whereas in the method according to the invention this is extracted from a log file, taken apart, and reassembled in combination with new content.

The messages are sent in message packets, wherein in an example of the invention, the payload, the first counter value, and the first authenticator of a message are sent distributed over at least two message packets (for example, a first message packet contains the authenticator, and a second message packet contains counter value and payload). In another embodiment of the invention, a message packet contains the entire message with payload, counter value and authenticator.

Whether the messages with payload, counter value and authenticator are sent in a single message packet or distributed over two or more message packets is determined by the security mechanism used. With SecOC, for example, the former is the case, and with IPsec sometimes the latter. The only important thing here is that a message secured by a particular first authenticator is provided with a second, current authenticator and with a corresponding second counter value, which replace the first obsolete authenticator and the obsolete first counter value.

Preferably, the receiver ECU is given by a real ECU—for example in a HIL test—or by a virtual ECU if the bus communication is to be tested as part of a virtual validation.

Virtual validation here means testing ECUs by simulating the ECU network (and its environment, e.g., in terms of a vehicle and a traffic situation) without concrete hardware and with the aid of a corresponding offline simulator, which also simulates, for example, the time response and communication of an ECU network. A virtual ECU is more or less a preliminary stage of an ECU implemented in software and usually already contains the final production code. However, it does not yet require the real hardware of the ECU, even though the future operating system is usually already simulated and realistic planning behavior is emulated based on the time and trigger information defined for the functionalities, so that the virtual ECU can, e.g., be connected to a simulated bus (https://www.dspace.com/de/gmb/home/news/engineers-insights/blog-virtuals-ecus-1808.cfm).

The payload of the first secured messages can also be encrypted using the first counter value and is first decrypted and then re-encrypted in the replay unit using the encryption and the second counter value.

Which parts of the message are to be decrypted and encrypted can also be included in the information about encryption.

This can be applied to so-called services that are transmitted in secured messages, and thus also enables the replay of a so-called service discovery, for example of network and/or system services.

The messaging system can be given by a bus communication system or a network or a combination of bus system and network, in particular by an automotive messaging system, wherein the messaging system is real or is simulated as part of a virtual validation.

Preferably, it is enabled that during manipulation, i.e., the creation of the second secured messages, errors can also be selectively interspersed. For example, information about the encryption can include additional information to create the second secured messages for test purposes in such a way that they are recognized by the receiver ECU as erroneous. This also allows for the security mechanisms to be tested.

The object is also achieved by a replay unit for carrying out the method according to the invention.

The replay unit according to the invention extends the function of the replay units of the prior art in that the sent messages now no longer include only stored messages but quasi of newly generated or reprocessed messages, which partly contain the old information (in particular the payload) but are modified with new information (authenticator and/or counter value) so that they are accepted or specifically discarded by the receiver ECU.

Preferably, the replay unit can be designed as an (additional) unit for an HIL-simulator (in the form of hardware with corresponding software) and/or for a simulator for virtual validation (as a pure software unit or additional program).

Advantages of the method and the replay unit according to the invention are that, first, it is not necessary to deactivate the security mechanism in the ECU under test in order to enable the ECU under test not to discard the messages recorded at an earlier point in time as inadmissible messages, and second, that the protection mechanism itself, or its correct execution, can be checked by the ECU under test. This means that not only safety but also security functions can be tested.

The invention makes it possible to record secured communications in the vehicle and use them for later backups, e.g., at the HIL, but also in the case of virtual validation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The following description of the invention is based on Secure Onboard Communication (SecOC) but can also be applied to other methods.

With authentication in the SecOC, transmission on the medium changes in comparison with unsecured message transmission, because in addition to the user data, other data is now transmitted in the message, which enables the recipient to determine whether the received data is valid or not. The original PDU (Protocol Data Unit), which only contained the user data, is now replaced by a so-called "secured PDU".

Figure 1:
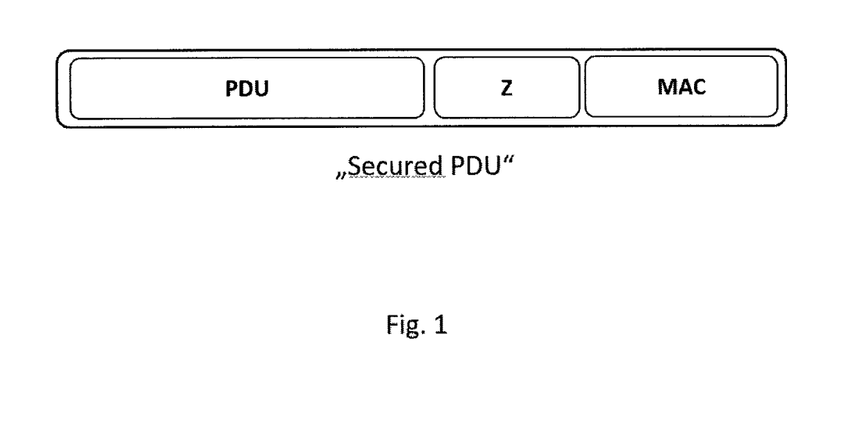
FIG. 1 shows a secured message.

FIG. 1 shows the structure of such a secured message. In the case of protected communication according to the SecOC standard as per AUTOSAR and FIBEX, the "secured PDU" is transmitted. This includes the still unencrypted user data PDU, a counter value Z and an encrypted authenticator MAC. The user data PDU are not encrypted, but without knowledge of the communication description, e.g., in the form of the so-called K-Matrix or Communication Matrix, the information is missing as to where which data can be found (counter value Z (also called "FreshnessValue" in SecOC), Authenticator MAC, payload PDU). Without this information, an interpretation of the data is complex, but can be determined, e.g., by means of certain algorithms.

Figure 2:
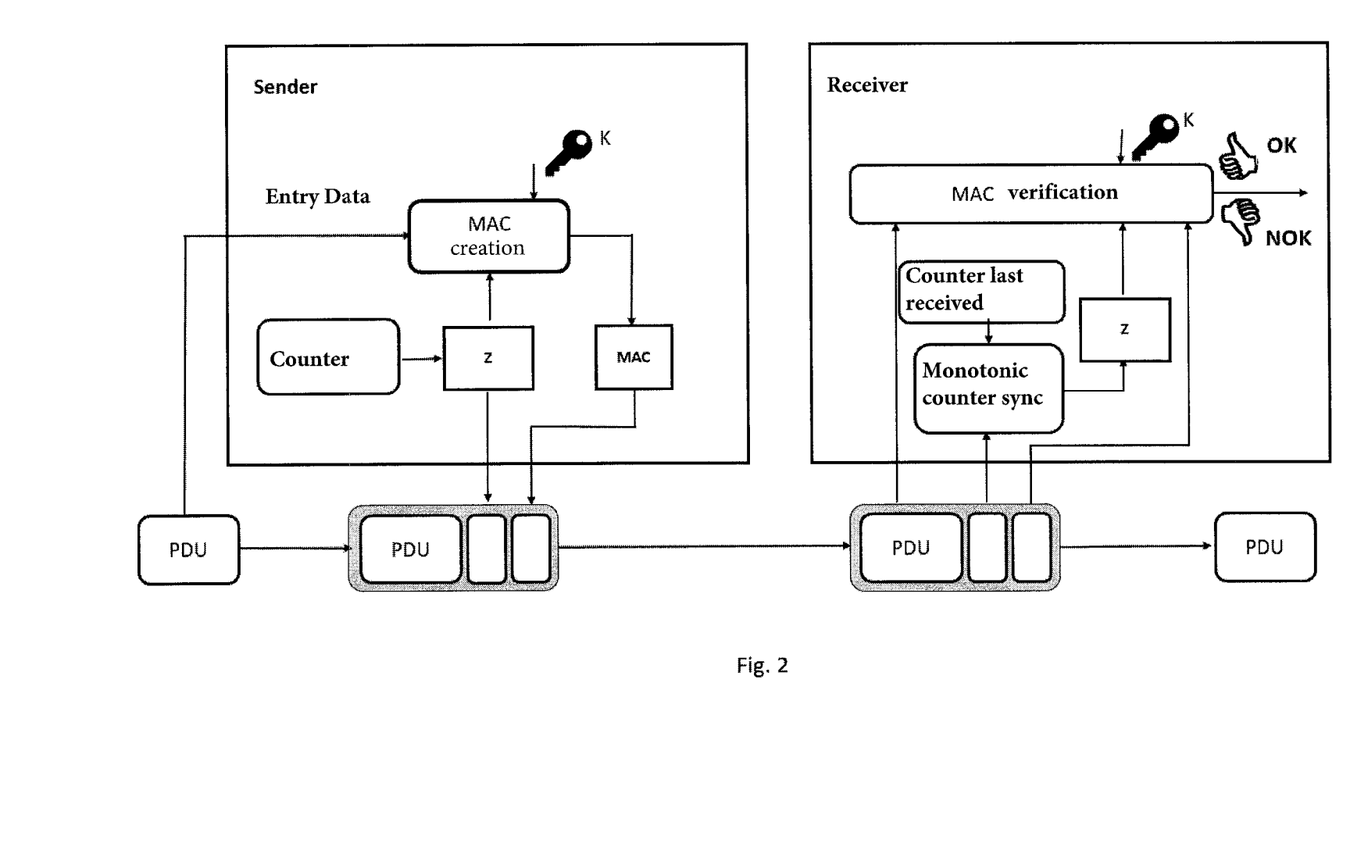
FIG. 2 is a schematic view of the Secure Onboard Communication according to AUTOSAR 4.2.1.

In addition to the still unencrypted user data (now called PDU or "authentic PDU"), the secured message contains a counter value Z (also called "Freshness Value") and an authenticator (MAC "Message Authentication Code"). This authenticator MAC is an encrypted value which is calculated by means of a key algorithm, a secret key K, the user data PDU and the counter value Z. This procedure is shown in FIG. 2. The counter value Z is a continuous, monotonically increasing counter value. On the sender side, the counter value Z, and information/data from the payload PDU are used to generate the authenticator MAC. A message packet containing payload PDU, counter value Z and authenticator MAC is then created by the sender. On the receiver side, the authenticator MAC and the counter value Z are checked and based on the check it is decided whether the message is valid or not, i.e., whether the payload may be used or not.

Figure 3:
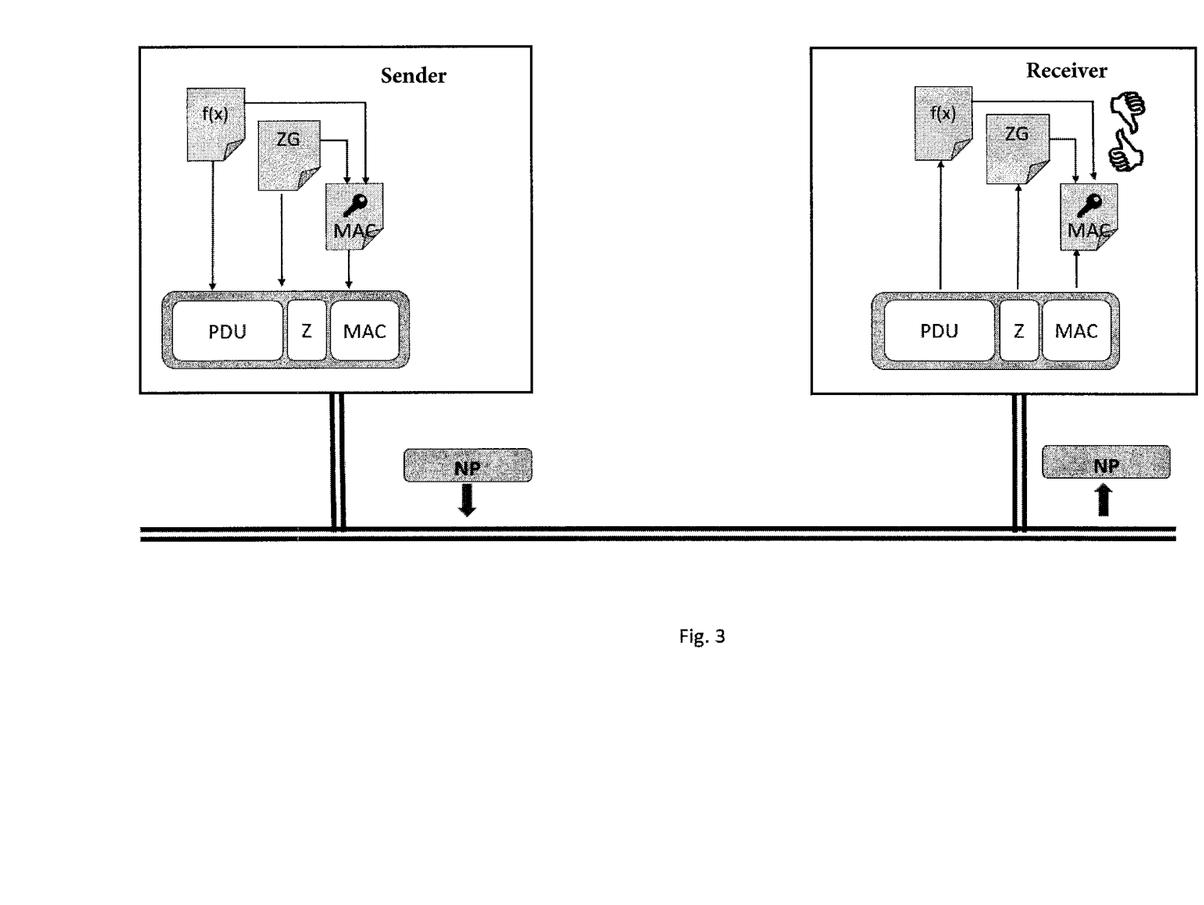
FIG. 3 is a schematic view of common ECU communication when using a secured communication.

FIG. 3 shows normal ECU communication when using secured communication.

In a transmitting ECU (transmitter), the application software generates the user data PDU to be transmitted (f(x)). Furthermore, there are a module for counter value generation ZG and a generator for the authenticator MAC. In the lower software layers, the COM configuration (communication description, e.g., in the form of the K-matrix) is used, among other things, to determine which data in the message to be transmitted or in the corresponding message packet NP to be transmitted represent the counter value Z, and which represent the MAC authenticator.

Completely packaged, this message is then sent as a message packet NP on the bus/network. On the bus/network, in the data contained in the message packet NP, it is not possible to differentiate between user data PDU, counter value Z and authenticator MAC without knowledge of the K-matrix or a suitable algorithm for data interpretation.

When testing ECUs, e.g., with an HIL for real-time testing or with an offline simulator for virtual validation, information about the K-matrix, or the K-matrix, is usually available. However, it would also be possible to determine user data PDU and counter value Z on the basis of data analysis (i.e., by means of an appropriate algorithm for data interpretation). This complication is generally not necessary to be able to carry out the invention because of the knowledge about the K-matrix; however, it represents another embodiment of the invention.

In FIG. 3, the receiver ECU (receiver) receives the message and evaluates it in the reverse order to that of the transmitter. On the basis of an authenticator check, the receiver ECU decides whether the received user data PDU are to be used for the application, i.e., the corresponding function f(x) in the receiver ECU, or not.

Figure 4:
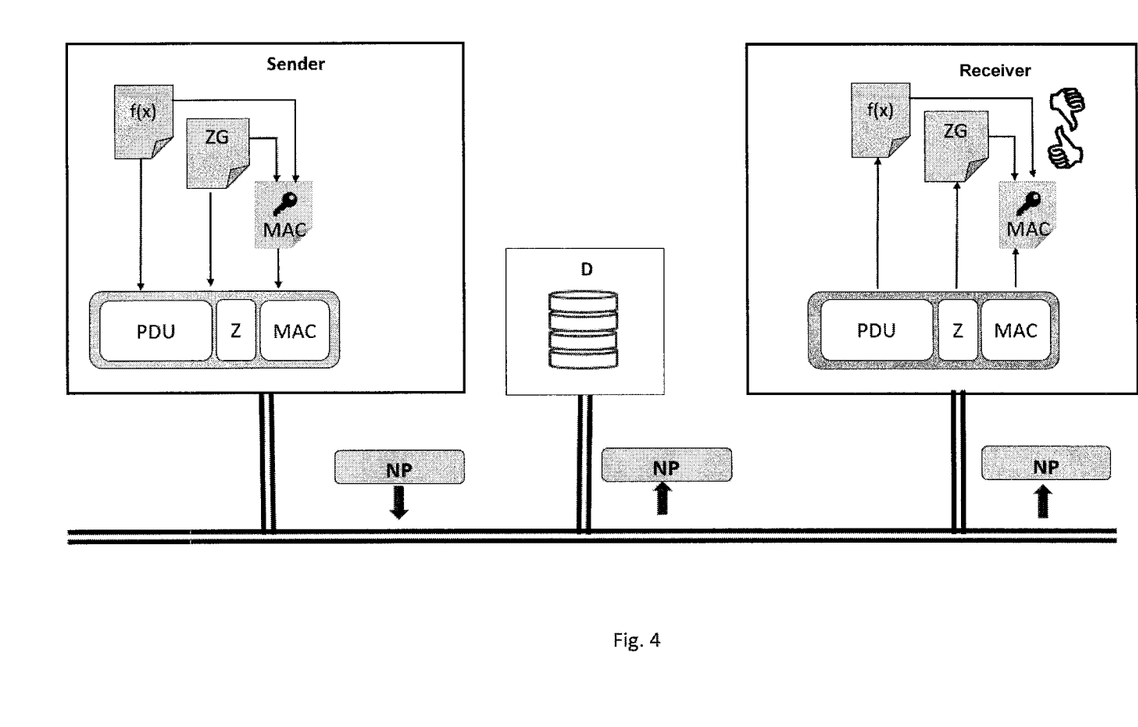
FIG. 4: shows storage of sent data using a data logger.

If communication between ECUs is to be used for later replay, the communication is tapped at the bus or, in the case of a network, mirrored by means of a switch or test access points. This is shown in FIG. 4. To record, a data logger D is typically used, which gathers the data in a mass memory. Storage takes place without interpreting the data.

In the case of unprotected communications, the data for stimulating the receiver ECU can be sent more or less unchanged (an adjustment of time stamps may be possible) directly to the receiver ECU without the latter being able to detect stimulation (replay, i.e., pure replay/reloading of recorded messages).

In the case of protected communication, however, the recorded data can no longer be used without further manipulation, since the monotonic counter in the receiver ECU would detect that the message is out of date. However, changing the counter only would not be successful either since the counter value is included in the calculation of the authenticator MAC together with the user data.

Figure 5:
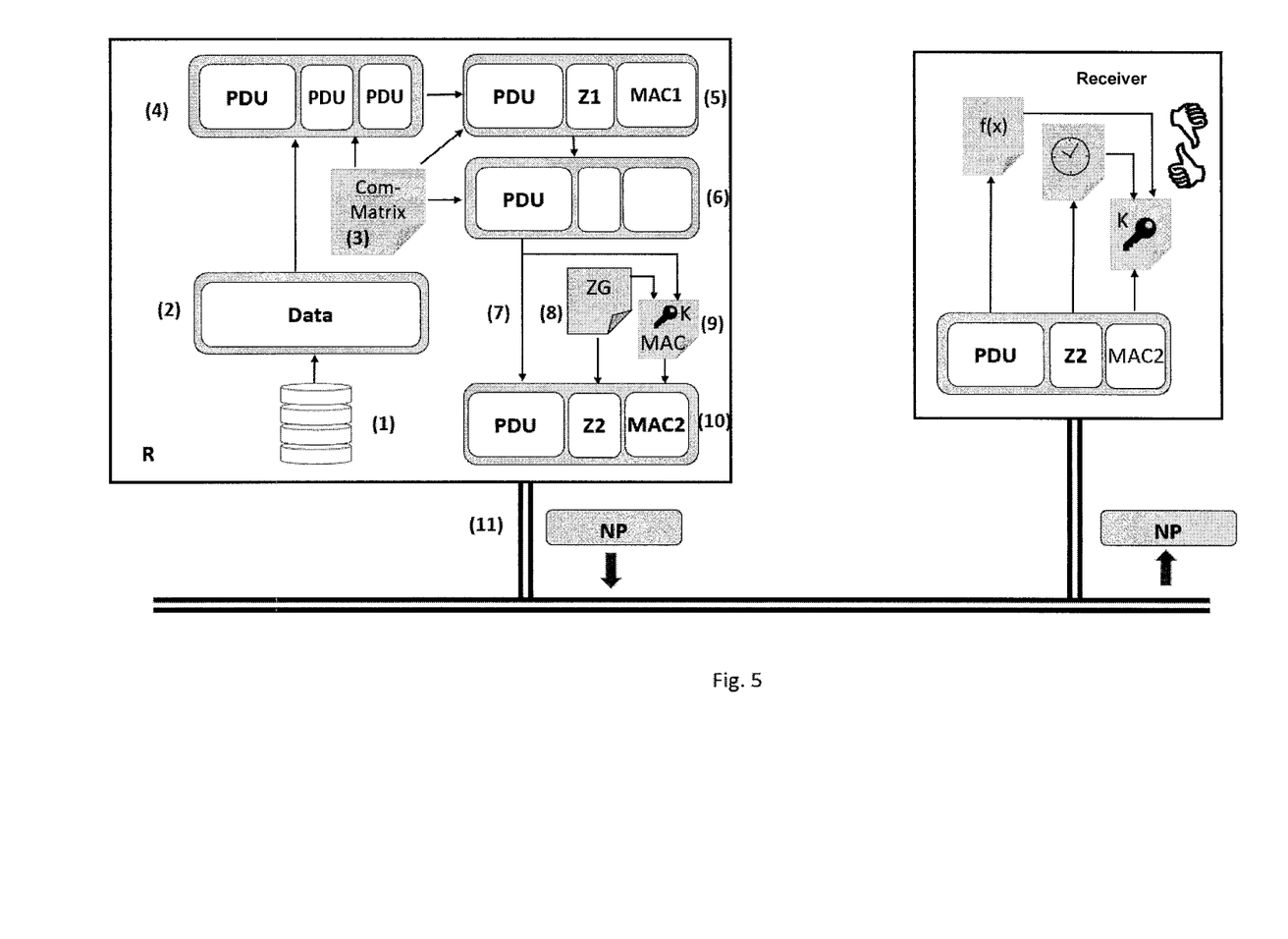
FIG. 5 shows a structure for data replay according to the invention with a protected communication.

Thus, the proposed solution is based on reusing only the user data from the recorded data and recalculating the remaining signals of the secured PDU (counter value Z and authenticator MAC) in the replay unit R.

FIG. 5 shows an embodiment of the method according to the invention with a replay unit R according to the invention.

The recorded data (secured messages) are read out by the mass memory (1). These are raw data (2), i.e., completely uninterpreted data, where it is not clear where the signals are located and how they are encoded. By means of a communication matrix (3) present or read in the replay unit R, the data can now be decoded and interpreted (4). (Decoding and interpretation are not tasks of replay units in the state of the art. These only replay data, at most changing the time stamp). Using the information from the communication matrix (3), the signals from the first counter value Z1 and the first authenticator MAC1 can now also be identified (5) and filtered out (6). The user data PDU are reused for the message to be sent (7). The signals for the second counter value Z2 and the second authenticator MAC2 are newly generated in the replay unit R, or in the bus simulation in the HIL or offline simulator, in the same way as in the ECU ((8) and (9)). Second counter value Z2 and key K are provided by the user, for example. Together with the user data PDU, a valid message is reassembled from them (10), which is then sent as a message packet NP via the bus or network (11).

Another embodiment of the invention is to selectively manipulate the counter value Z and authenticator MAC signals to test the safeguards in the receiver ECU. Thus, a correct counter value Z but an incorrect authenticator MAC can be used, or the authenticator MAC can be correct and the counter value Z incorrect.

For security mechanisms other than SecOC, the message with user data, counter value, and authenticator might not be sent in a single message packet, but rather distributed over several message packets, for example in the case of IPsec or cryptographic PDUs. The method according to the invention can also be applied to such methods. Slight modifications may then have to be made with respect to the counter value. With IPsec, the counter value—there called a sequence number—for example, does not need to be monotonically increasing, but must lie within a certain window of sequence numbers ("sliding window").

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for sending recorded secured messages via a messaging system to a receiver engine control unit (ECU) to be tested, wherein the recorded secured messages are sent via message packets, the method comprising:
   providing first secured messages for processing in a replay unit, the first secured messages comprising a payload, a first counter value and a first authenticator,
   wherein the replay unit is provided with the following information:
      at least portions of a communication description for the receiver ECU under test or a data interpretation algorithm;
      a second counter value for the receiver ECU; and
      information about an encryption and a corresponding key;
   via the replay unit:
      removing the first authenticator and the first counter value from the first secured messages using the communication description or using information obtained by means of the data interpretation algorithm;
      creating second secured messages by adding in each case the second counter value and creating and adding in each case a second authenticator using the second counter value, the information about the encryption as well as the corresponding key, and using the communication description or the information obtained via the data interpretation algorithm; and
      sending the second secured messages to the receiver ECU.

2. The method according to claim 1, wherein a message is sent distributed over a plurality of message packets.

3. The method according to claim 1, wherein the receiver ECU is a real ECU or a virtual ECU.

4. The method according to claim 1,
   wherein the second counter value is given in each case by the current counter value for the receiver ECU to be tested, or
   wherein the second counter value is given by a counter value preset by a user or by an automatically calculated counter value.

5. The method according to claim 1, wherein the payload of the first secured messages is also encrypted using the first counter value and the payload is decrypted in the replay unit and encrypted again via the encryption and the second counter value.

6. The method according to claim 1, wherein the messages contain services, in particular network or system services.

7. The method according to claim 1, wherein the messaging system is given by a real or simulated bus communication system or a real or simulated network or a combination of bus system and network, in particular by an automotive messaging system.

8. The method according to claim 1, wherein the information about encryption also includes information for creating the second secured messages for testing purposes in such a way that the receiver ECU detects them as erroneous.

9. A replay unit for sending secured messages via a messaging system to a receiver engine control unit (ECU) to be tested, the replay unit being connected via the messaging system with the receiver ECU to be tested, the replay unit comprising:
   means for receiving first secured messages to be replayed;
   means for removing a first counter value and a first authenticator from the first secured messages;
   means for generating a second authenticator via a second counter value, an encryption algorithm and a key;
   means for generating second secured messages by adding the second counter value and the second authenticator to the first secured messages; and
   means for sending the second secured messages to the receiver ECU under test via the messaging system.

10. The replay unit according to claim 9, wherein the replay unit is designed as an additional unit for a hardware-in-the-loop (HIL) simulator and/or for a simulator for virtual validation.

11. A replay unit, comprising:
   a memory configured to store a first secured message sent from a transmitter ECU, the first secured message comprising user data, first counter value, and a first authenticator, the first authenticator having been generated at the transmitter ECU based on a secret key, the user data, and the first counter value, the first secured message being encrypted;
   a communication matrix (K-matrix) configured to decode and filter out the first counter value and the first authenticator from the first secured message;
   a counter value generator (ZG) configured to generate a second counter value; and
   a MAC authenticator configured to generate a second authenticator based on the user data, the second counter value, and the secret key,
   wherein the replay unit assembles a second secured message comprising the user data, the second counter value, and the second authenticator, the second secured message being encrypted and sent to a receiver ECU.

12. The replay unit of claim 11, wherein the communication matrix is necessary to differentiate between the user data, the first counter value, and the first authenticator in the first secured message.

13. The replay unit of claim 11, wherein the second counter value is greater than the first counter value.

* * * * *